United States Patent [19]

Roberson, Sr.

[11] 4,203,473

[45] May 20, 1980

[54] CLOSURE PLUG ASSEMBLY

[76] Inventor: Walter H. Roberson, Sr., 808 Second St., Altamonte Springs, Fla. 32701

[21] Appl. No.: 900,146

[22] Filed: Apr. 26, 1978

Related U.S. Application Data

[62] Division of Ser. No. 741,369, Nov. 12, 1976, Pat. No. 4,122,869.

[51] Int. Cl.² .................... F16L 55/12; G01M 3/00
[52] U.S. Cl. .................................. 138/93; 73/49.8; 4/255
[58] Field of Search .................. 73/49.8, 46; 138/93, 138/90; 4/255, 257

[56] References Cited

U.S. PATENT DOCUMENTS

| 580,689 | 4/1897 | Hearne et al. | 138/93 |
|---|---|---|---|
| 827,835 | 8/1906 | White | 138/93 |
| 1,506,418 | 8/1924 | Evensta et al. | 138/93 X |
| 1,814,677 | 7/1931 | Fennema | 138/93 |
| 2,299,116 | 10/1942 | Svirsky | 73/46 UX |
| 2,843,154 | 7/1958 | Hosking | 138/93 |
| 3,120,859 | 2/1964 | Wakley | 138/93 |
| 3,129,726 | 4/1964 | Moore | 138/93 X |
| 3,241,571 | 3/1966 | Garcia | 138/90 |

FOREIGN PATENT DOCUMENTS

| 504392 | 8/1930 | Fed. Rep. of Germany | 138/93 |
|---|---|---|---|
| 2240333 | 2/1974 | Fed. Rep. of Germany | 138/93 |

*Primary Examiner*—Gerald Goldberg
*Assistant Examiner*—Joseph W. Roskos
*Attorney, Agent, or Firm*—Neil F. Markva

[57] ABSTRACT

The closure plug assembly is used for pressure testing of fluid drain and vent systems. The assembly comprises an inflatable body portion or bulb connected to a rigid holder portion. The rigid holder portion includes a stem section and a plug section. The stem section is hollow and opens at one end into the inflatable body portion and at the other end receives a valve for pumping fluid pressure into the bulb. A gauge is disposed over the valve end of the rigid stem member to provide a continuous monitoring of the pressure within the bulb.

7 Claims, 12 Drawing Figures

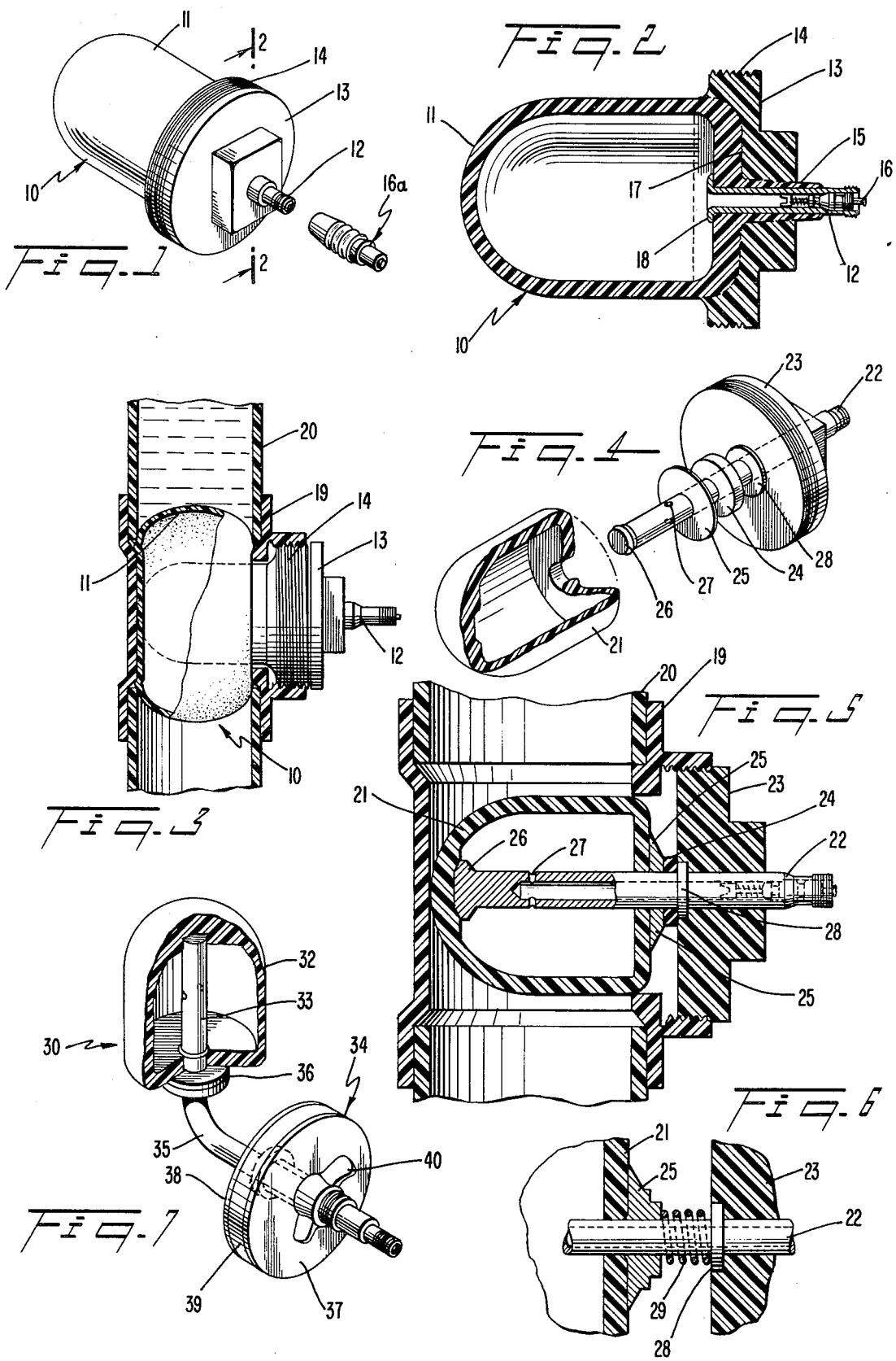

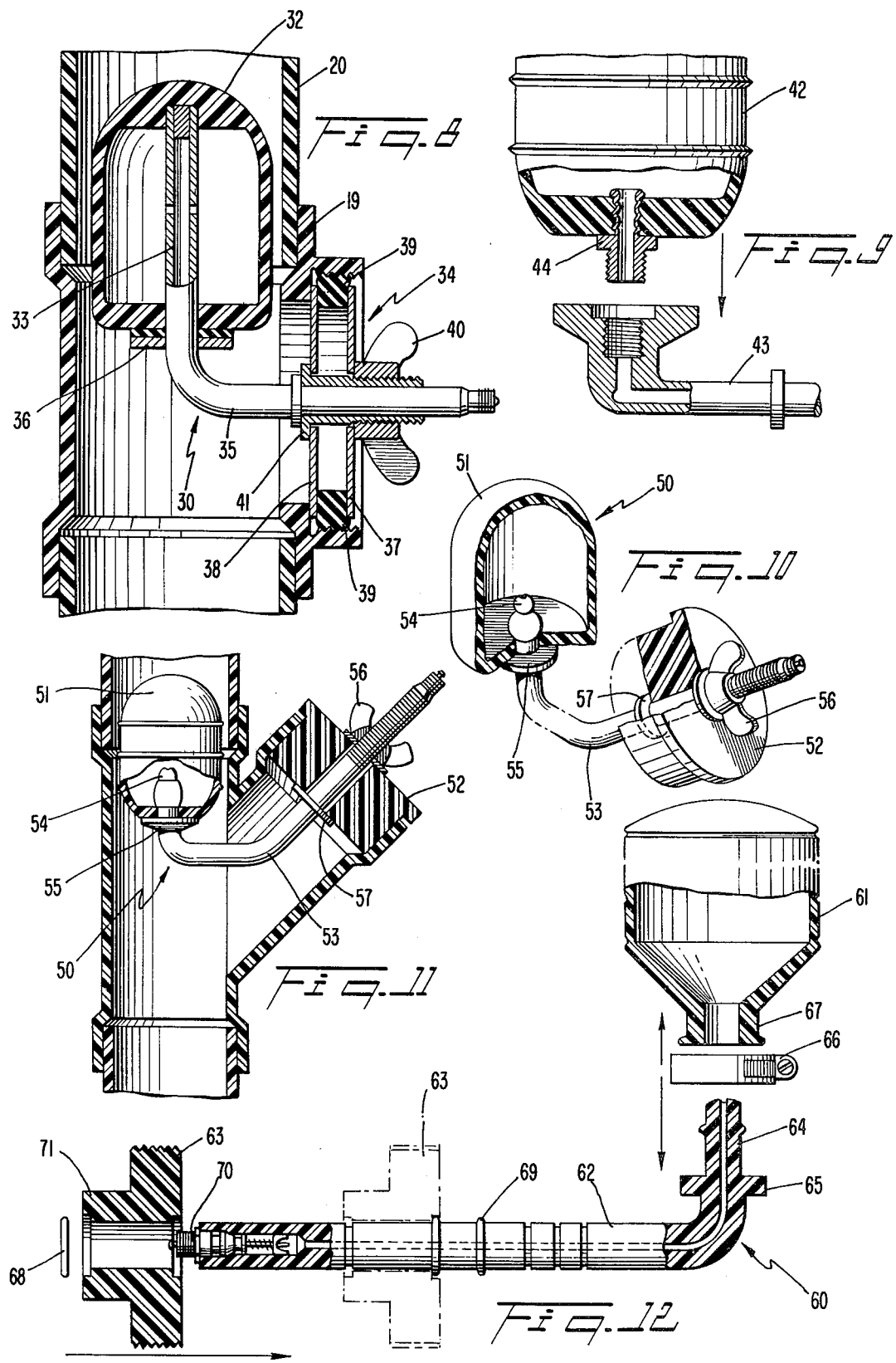

CLOSURE PLUG ASSEMBLY

This is a division, of application Ser. No. 741,369 filed Nov. 12, 1976, now U.S. Pat. No. 4,122,869, issued Oct. 31, 1978.

BACKGROUND OF THE INVENTION

This invention relates to closure plug assemblies for sealing fluid conduits. More particularly, the plug assembly of this invention is used for pressure testing of fluid drain and vent systems. The plug assembly is used for sealing sections of connecting conduits such as a Y or T connection and is also adapted to sealing off an open end of an incomplete pipeline.

It is common in the plumbing industry to test drain and vent systems for possible leakage. It is necessary to seal an installed pipeline and apply a predetermined fluid pressure therein. There are several known devices and assemblies available for accomplishing this purpose.

To test for leaks in the drainage system, an inflatable ball is inserted in the line through either a T or Y connection. Once in place, the ball is inflated in the line. However, the prior art testing devices have a ball that can easily slip under the fluid pressure. If it does slip, it will be pushed down the line where it will cause a complete stoppage of the system. It may very well be necessary to break up the building construction around the installed plumbing in order to retrieve the ball that has slipped. To keep the ball of the prior art device from slipping, it is a common practice to overinflate this ball within the line. Thus, an attempt is made to withstand the fluid pressure as well as seal the pipeline. Under these circumstances, the overinflated ball often bursts and is then caused to slip down the line.

PURPOSE OF THE INVENTION

The primary object of this invention is to provide a closure plug assembly having a rigid connection secured to the drain system being tested.

A further object of this invention is to provide a closure plug assembly having an inflatable body portion which does not have to be overinflated to maintain its position within a pressurized pipe system.

A still further object of this invention is to provide a closure plug assembly which is less expensive and obviates all of the attendant disadvantages associated with known prior art devices and assemblies.

SUMMARY OF THE INVENTION

These objects and other inventions are accomplished through the use of the closure plug assembly as disclosed and described herein. The closure plug assembly includes an inflatable body portion and a rigid holder portion. A means is provided for connecting the body portion to the holder portion. Valve means is used for inflating the body portion through the rigid holder portion. The rigid holder portion includes a stem section and a plug section.

A particular feature of this invention is directed to the use of a hollow stem section with an opening directed into the interior of the body portion at one end thereof. The other end of this stem section extends through the center of the plug section. The plug section is fixedly disposed in the opening of the pipe system to prevent a flow of liquid therethrough.

Other features of the invention are directed to the specific manner in which the inflatable body portion is connected to one end of the stem section and particular mechanisms for fixedly securing the plug section within the access opening of the pipe system.

A further feature is directed to the use of a gauge means providing a continuous monitoring of the amount of fluid air pressure within the inflatable body portion. The particular shape of the hollow stem portion also provides a unique facility of use for the closure plug assembly of this invention.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is a perspective view of a first embodiment of an assembly made in accordance with this invention, FIG. 2 is a sectional view taken along line 2—2 of FIG. 1, FIG. 3 is a fragmentary sectional view showing the assembly of FIG. 1 in an operational use, FIG. 4 is an exploded view partially in section of a further embodiment of an assembly made in accordance with this invention, FIG. 5 is a sectional view of the assembly of FIG. 4 shown in an operational use, FIG. 6 is a fragmentary sectional view of a detail of another embodiment of the device shown in FIGS. 4 and 5, FIG. 7 is a perspective view partially in section of a further embodiment of an assembly made in accordance with this invention, FIG. 8 is a cross-sectional view of the assembly of FIG. 7 as shown in an operational use, FIG. 9 is a fragmentary view partially in section showing a further embodiment of an assembly made in accordance with this invention, FIG. 10 is a perspective view partially in section of another embodiment of an assembly made in accordance with this invention, FIG. 11 is a sectional view of the embodiment shown in FIG. 10 in an operational use, and FIG. 12 is an exploded cross-sectional view of a further embodiment of an assembly made in accordance with this invention.

DESCRIPTION OF SPECIFIC EMBODIMENTS

More specifically, a closure plug assembly, generally designated 10, is shown in FIGS. 1 through 3. The assembly 10 comprises an inflatable bulb or ball 11 having a projection 15 extending through a plug member 13. In this specific embodiment, bulb 11 and plug 13 are joined by an adhesive material along the interface 17. A hollow stem 12 extends through projection 15 and plug 13. A flange 18 rests against an inner surface of inflatable bulb 11.

A standard pneumatic valve 16 is disposed at the open end of stem 12. Plug member 13 includes threads 14 which threadingly engage the tee 19 located in line 20 as shown in FIG. 3. A standard type of air pump may be used to inflate bulb 11. A gauge 16a is disposable over the end of the stem 12 and will continuously monitor the amount of fluid pressure within the inflatable bulb 11. As shown, the stem section 12 is rigid, straight and hollow and is connected at one end thereof to the bulb 11 and extends with the other end thereof projecting through the plug 13.

The embodiment shown in FIGS. 4 and 5 comprises an inflatable bulb 21 disposed on the end of the rigid stem section 22. The other end of the stem section 22 extends through the center of the threaded, cylindrically shaped plug member 23. The bottom of the bulb 21 rests against the flange 25. The end of the stem 22 includes a base 26 which rests against the opposing face of the interior surface of bulb 21 as shown. This particular embodiment is utilized when bulb 21 is composed of material that is extremely flexible and of thin wall construction. In other words, additional support is obtained through the use of the full projection of the end of the stem 22 into the interior of bulb 21. Air is pumped in via holes 27. A resilient member 24 is disposed between the bulb seating flange 25 and the plug seating flange 28. A biasing force enables the plug 23 to be tightened in place within the tee 19 as shown.

An alternative detail is shown in FIG. 6 wherein a spring 29 is substituted for the resilient washer biasing member 24 shown in FIG. 5. Otherwise, the function is precisely the same.

The embodiment as shown in FIGS. 7 and 8 provides an assembly 30 having a bulb 32 mounted at one end of the curved stem section 35. An expandable plug member 34 is disposed at the other end of the stem 35 between the flange 41 and wing nut 40. As shown, when the wing nut 40 is tightened downwardly, the annular flexible member 39 which is threadingly engaged with the threads of the tee connection 19 as shown will expand and tighten the plug in place. The annular ring member 39 is squeezed between the plates 37 and 38 during the tightening process.

Bulb 32 rests against the ball seating flange 36 over the stem end projection 33 as shown. Holes are provided as shown to enable the air to be pumped into the inflatable bulb 32 via the hollow stem 35 in the same manner as in the earlier embodiments.

The embodiment as shown in FIG. 9 shows the detail of the use of a coupling member 44 constituting a means for connecting the body portion or bulb 42 to the holder portion or stem 43. As shown, one end of the coupling member 44 is connected to the bulb 42 and the other end of the coupling member 44 is threadingly engaged with the stem section 43.

A further embodiment of the invention is shown in FIGS. 10 and 11. The plug closure assembly, generally designated 50, includes an inflatable body portion or bulb 51 removably disposed over the nipple section 54 located at one end of the stem section 53. The enlarged portion of the nipple 54 facilitates the holding of the bulb 51 against the flange 55. The other end of the stem 53 extends through an expandable plug member 52. Once inserted at a Y-junction as shown, plug 52 will expand outwardly when the wing nut 56 is tightened down and exerts a pressure in a direction toward the flange 57.

The embodiment as shown in FIG. 12 includes a bulb 61 having a neck portion 67 which fits over a nipple 64 disposed at the end of the hollow stem section 62. The neck portion 67 abuts against the flange 65 which is disposed at the curved end of the stem 62. A standard stainless steel clamp 66 is disposed around the outer surface of neck portion 67 to tighten the bulb 61 onto the nipple portion 64.

The hollow stem portion 62 has a right-angle curve at the nipple portion end thereof. The other end of the stem section 62 projects through the center of the rigid or solid plug member 63 which has threads along the outer circumferential surface. Plug 63 has a cylindrical shape and threadingly engages the inside threads of the pipe section outlets as shown in the previous embodiments. A ring 69 limits the movement of the plug 63 with respect to the longitudinal distance along the stem section 62. A further ring 68 is disposed in place after the plug 63 and stem section 62 are set in working operation with respect to each other. A standard penumatic valve 70 is disposed in the open hollow end of stem section 52. A wrench engaging section 71 is reduced in cross-sectional size with respect to the threaded portion of plug 63.

The inflatable body portion in each of the embodiments discussed hereinabove may be composed of rubber or synthetic material, such as Kraton (a registered trademark). It must have a resiliency to facilitate the inflating of the bulbs once they are inserted into the drain or vent line. It is contemplated that the skilled artisan may wish to mold the body portion directly to the end of the stem section. However, the advantage of the removably disposed body portion is that when the material no longer functions properly, the bulb can be simply and reliably replaced without having to replace the entire assembly.

In operation, the assembly is easily handled and readily adapted to placement in a tee or Y-section in a drain or vent system. Thus, as disclosed herein, the plug section has a structural configuration to engage the test opening in the tee or Y-test section of the drain or vent system. The rigid holder portion facilitates the insertion of the bulb in the desired location. The plug member provides stability and further rigidity. Once the plug is fixed in the opening, any type of pumping device may be attached to the protruding end of the rigid stem section. The standard air pressure valve gauge 16a maintains a first color which is generally red, as long as the proper amount of pressure is in the bulb. If the bulb pressure goes below the preset amount, the valve gauge 16a simple changes color.

Once the device of this invention is in place, there is no way that the bulb can slip out of its location and go down the line at another point therein. Because the rigid holder is used in combination with the fixed plug member, the amount of air necessary to inflate the bulb is sufficient once the seal has been effected between the inflated bulb and the inside surface of the conduit or drain pipe. That is, the water pressure being tested is offset by the rigid construction of the stem and plug closure combination. The bulb does not have to be overinflated with enough pressure to withstand all the fluid pressure being tested in the system. As is evident in the drawings, the plug engages the test opening and tightening means secures the plug engaged in place in the test tee or Y-test section throughout the operation of the assembly as stated above. The tightening means includes the threaded engagement of outer threads on the plug with inner threads of the test opening on the embodiments of FIGS. 1–8, and 12. The tightening means includes an expandable plug which tightens against the inner surface of the test opening as shown in the embodiments of FIGS. 7, 8, 10 and 11.

In the specific embodiments disclosed herein, there is a generally cylindrically shaped section in each of the bulbs 11, 21, 32, 42, 51 and 61. Ribs may be included around the outer circumferential surface of the cylindrical portion to provide additional sealing capabilities. As is evident in FIGS. 7–12 bulbs 32, 41, 51 and 61 are disposed on an end portion of each stem section. The end portion extends in a direction parallel to a longitudinal axis of the pipeline in which the test assembly is located. Each of the bulbs is disposed on this end portion. Therefore, the generally cylindrical-shaped section of each bulb has a longitudinal axis that extends in a direction parallel to the longitudinal axis of the pipeline in which the test assembly is installed.

While the closure plug assembly has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A closure plug assembly for the pressure testing of liquid drain and vent systems having a Y-test section with a test opening, said test assembly comprising:
   (a) an inflatable body portion having an inner surface and an outer surface,
   (b) a rigid holder portion having a rigid hollow stem section and an expandable plug section having a portion which engages said test opening,
   (c) said rigid hollow stem section having an opening directed into the interior of the body portion at one end thereof and extending through the expandable plug section at the other end thereof,
   (d) tightening means for securing said plug section in place in said test section throughout the operation of the assembly,
   (e) stem end means for connecting the body portion to the rigid holder portion at said one end thereof which end includes a right angled curve, and
   (f) valve means being located at said other end of said hollow stem section for inflating the body portion through the hollow stem section,
   (g) said other end of the hollow stem section including a further angled curve to fit said assembly to said Y-test section.

2. A closure plug assembly for the pressure testing of liquid drain and vent systems having a tee or Y-test section with a test opening, said test assembly comprising:
   (a) an inflatable body portion having an inner surface and an outer surface,
   (b) a rigid holder portion having a rigid hollow stem section and plug section having a portion which engages said test opening,
   (c) said rigid hollow stem section having an opening directed into the interior of the body portion at one end thereof and extending through the plug section at the other end thereof,
   (d) tightening means for securing said plug section in place in said test section throughout the operation of the assembly,
   (e) stem end means for connecting the body portion to the rigid holder portion, and
   (f) valve means for inflating the body portion through the hollow stem section,
   (g) said body portion includes an extension having a bore therethrough,
   (h) said extension section projects through said plug section, and
   (i) said stem section extends through the bore of the extension section and the plug section.

3. A closure plug assembly
   (a) an inflatable body portion having an inner surface and an outer surface,
   (b) a rigid holder portion having a rigid hollow stem section and an expandable plug section having a portion which engages said test opening,
   (c) said rigid hollow stem section having an opening directed into the interior of the body portion at one end thereof and extending through the expandable plug section at the other end thereof,
   (d) tightening means for expanding and securing said plug section in place in said test section throughout the operation of the assembly,
   (e) stem end means for connecting the body portion to the rigid holder portion, and
   (f) valve means for inflating the body portion through the hollow stem section,
   (g) said plug section is cylindrical and has an annular expandable ring member located between two tightening plates,
   (h) said tightening means includes an outer threaded surface on said expandable ring member and an inner threaded surface on said test opening into a drain or vent system for threaded engagement with respect to each other.

4. An assembly as defined in claim 3 wherein said tightening means includes a nut member which threadingly engages said stem section and tightens down toward said expandable plug section.

5. A closure plug assembly for the pressure testing of liquid drain and vent systems having a tee or Y-test section with a test opening, said test assembly comprising:
   (a) an inflatable body portion having an inner surface and an outer surface,
   (b) a rigid holder portion having a rigid hollow stem section and an expandable plug section having a portion which engages said test opening,
   (c) said rigid hollow stem section having an opening directed into the interior of the body portion at one end thereof and extending through the expandable plug section at the other end thereof,
   (d) tightening means for expanding and securing said plug section in place in said test section throughout the operation of the assembly,
   (e) stem end means for connecting the body portion to the rigid holder portion,
   (f) valve means for inflating the body portion through the hollow stem section, and
   (g) a resilient biasing means is disposed around the stem section and between the body portion and the plug section.

6. A closure plug assembly for the pressure testing of liquid drain and vent systems having a tee or Y-test section with a test opening, said test assembly comprising:
   (a) an inflatable body portion having an inner surface and an outer surface,
   (b) a rigid holder portion having a rigid hollow stem section and plug section having a portion which engages said test opening,
   (c) said rigid hollow stem section having an opening directed into the interior of the body portion at one end thereof and extending through the plug section at the other end thereof,
   (d) tightening means for securing said plug section in place in said test section throughout the operation of the assembly,
   (e) stem end means for connecting the body portion to the rigid holder portion, and (f) valve means for inflating the body portion through the hollow stem section,
(g) said hollow stem portion has a right-angle curve at one end thereof and a nipple portion at said curved one end,
(h) said body portion having a neck being removably connected to said nipple portion with clamp means.

7. A closure plug assembly for the pressure testing of liquid drain and vent systems having a tee or Y-test section with a test opening, said test assembly comprising:
(a) an inflatable body portion having an inner surface and an outer surface,
(b) a rigid holder portion having a rigid hollow stem section and plug section having a portion which engages said test opening,
(c) said rigid hollow stem section having an opening directed into the interior of the body portion at one end thereof and extending through the expandable plug section at the other end thereof,
(d) tightening means for securing said plug section in place in said test section throughout the operation of the assembly,
(e) stem end means for connecting the body portion to the rigid holder portion,
(f) valve means for inflating the body portion through the hollow stem section,
(g) said connecting means includes a flange at the interior opening of the stem section,
(h) said flange rests against the inner surface of the body portion and surrounds said interior opening,
(i) a portion of the outer surface of the body portion abuts the plug section along an interface, and
(j) adhesive material is disposed along said interface.

* * * * *